(12) United States Patent
Suzuki et al.

(10) Patent No.: US 10,737,963 B2
(45) Date of Patent: Aug. 11, 2020

(54) METHOD FOR PRODUCING GLASS MATERIAL AND APPARATUS FOR PRODUCING GLASS MATERIAL

(71) Applicant: NIPPON ELECTRIC GLASS CO., LTD., Otsu-shi, Shiga (JP)

(72) Inventors: Futoshi Suzuki, Otsu (JP); Osamu Odani, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 187 days.

(21) Appl. No.: 15/763,872

(22) PCT Filed: Nov. 14, 2016

(86) PCT No.: PCT/JP2016/083649
§ 371 (c)(1),
(2) Date: Mar. 28, 2018

(87) PCT Pub. No.: WO2017/090471
PCT Pub. Date: Jun. 1, 2017

(65) Prior Publication Data
US 2018/0282197 A1    Oct. 4, 2018

(30) Foreign Application Priority Data

Nov. 25, 2015    (JP) .................................. 2015-229588

(51) Int. Cl.
*C03B 19/10*    (2006.01)
(52) U.S. Cl.
CPC .................................. *C03B 19/1005* (2013.01)
(58) Field of Classification Search
CPC .................................................. C03B 19/1005
See application file for complete search history.

(56) References Cited

U.S. PATENT DOCUMENTS

| | | |
|---|---|---|
| 6,626,010 B1 | 9/2003 | Yoshida |
| 2006/0205095 A1 | 9/2006 | Yono et al. |
| 2015/0344349 A1 | 12/2015 | Sato et al. |

FOREIGN PATENT DOCUMENTS

| | | |
|---|---|---|
| CN | 101186426 A | 5/2008 |
| CN | 101190825 A | 6/2008 |

(Continued)

OTHER PUBLICATIONS

JP-08259242-A Google Patents Machine Translation Performed Dec. 11, 2019. (Year: 2019).*

(Continued)

*Primary Examiner* — Lisa L Herring
(74) *Attorney, Agent, or Firm* — Keating and Bennett, LLP

(57) ABSTRACT

Provided is a method for producing a glass material by a containerless levitation technique, which enables production of a large-sized glass material. The method includes the steps of: preparing a forming member and a cover member 20, the forming member including a gas jetting portion 11 in which a plurality of gas jet holes 12 for use in levitating a block of glass raw material are formed, the cover member 20 which is capable of covering a peripheral portion of a gas jetting surface 13 of the gas jetting portion 12 and in which a controlling surface 21 controlling, near the peripheral portion of the gas jetting surface 13, a flow of gas jetted through the gas jet holes 12 is formed and an opening 25 capable of releasing the gas to outside is formed; placing the block of glass raw material on top of the gas jetting surface 13 and covering the peripheral portion of the gas jetting surface 13 with the cover member 20; and heating the block of glass raw material to melting while holding the block of glass raw material levitated by jetting the gas through the gas (Continued)

jet holes 12 and then cooling the melted block of glass raw material.

6 Claims, 9 Drawing Sheets

(56) References Cited

FOREIGN PATENT DOCUMENTS

| CN | 101497491 A | | 8/2009 | |
|---|---|---|---|---|
| CN | 101397183 B | | 11/2012 | |
| JP | 08-12353 A | | 1/1996 | |
| JP | 08259242 A | * | 10/1996 | ............. C03B 40/04 |
| JP | 11-322348 A | | 11/1999 | |
| JP | 2002-201032 A | | 7/2002 | |
| JP | 2006-248801 A | | 9/2006 | |
| JP | 2009-096710 A | | 5/2009 | |
| JP | 2009-096711 A | | 5/2009 | |
| JP | 2014-141389 A | | 8/2014 | |

OTHER PUBLICATIONS

Official Communication issued in International Patent Application No. PCT/JP2016/083649, dated Dec. 20, 2016.
Suzuki et al., "Method for Producing Glass Material and Apparatus for Producing Glass Material", U.S. Appl. No. 16/820,905, filed Mar. 17, 2020.
Official Communication issued in corresponding Chinese Patent Application No. 201680068618.9, dated May 22, 2020.

* cited by examiner

[FIG. 1]
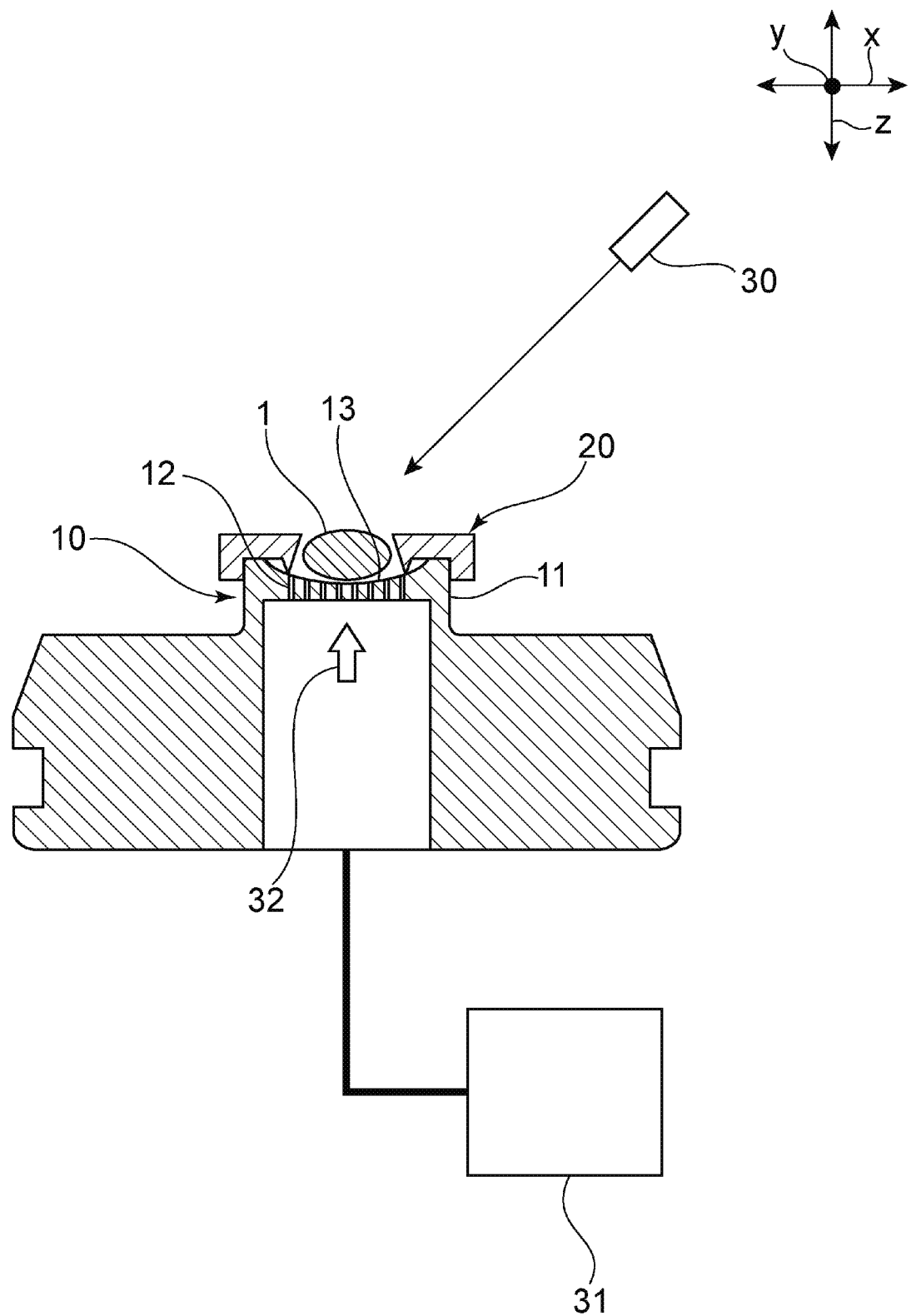

[FIG. 2]
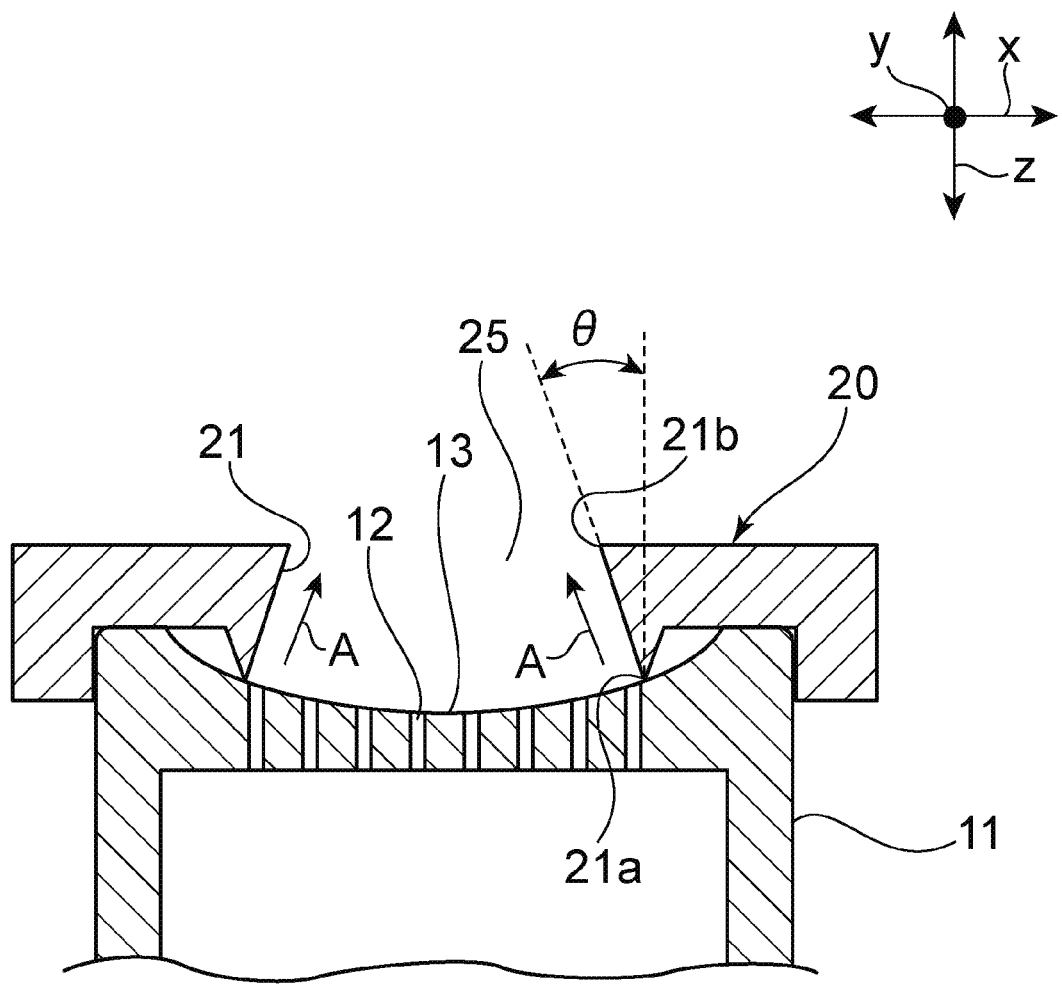

[FIG. 3]
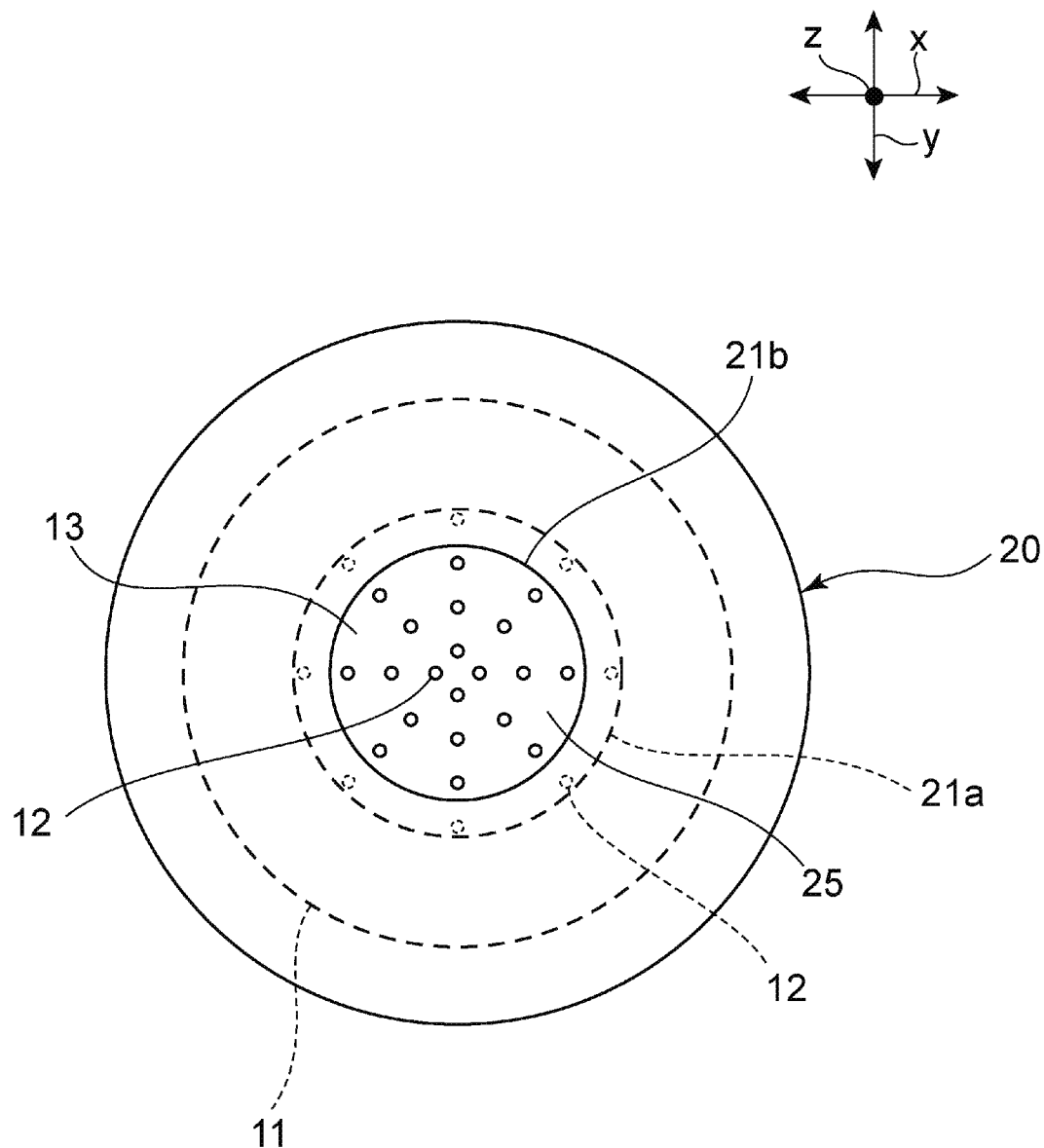

[FIG. 4]
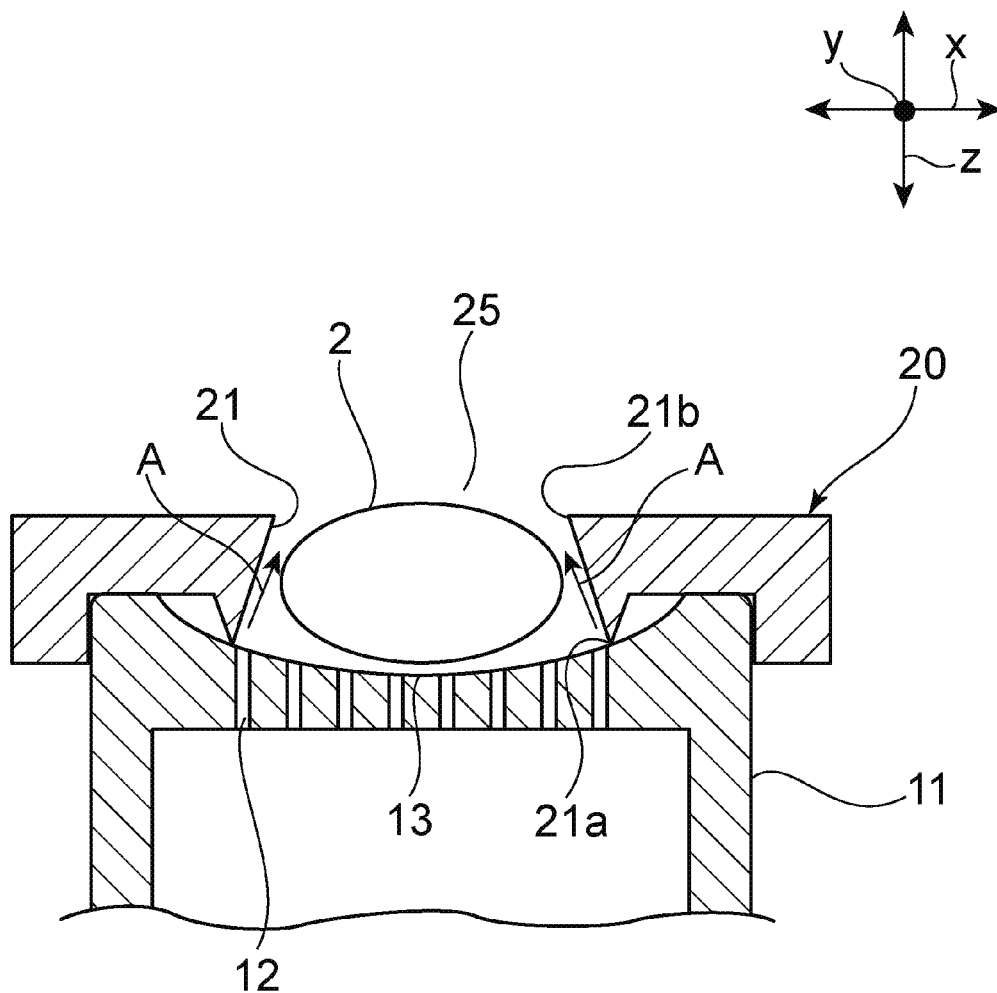

[FIG. 5]
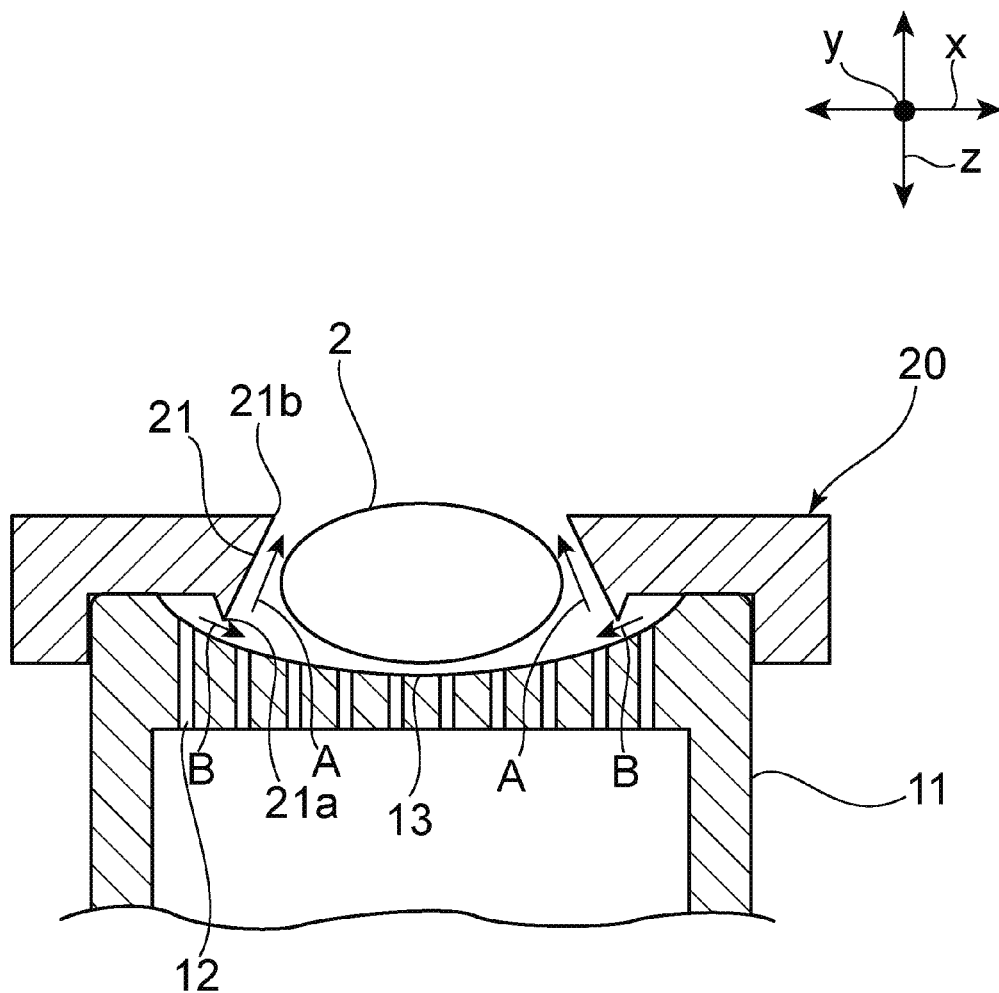

[FIG. 6]
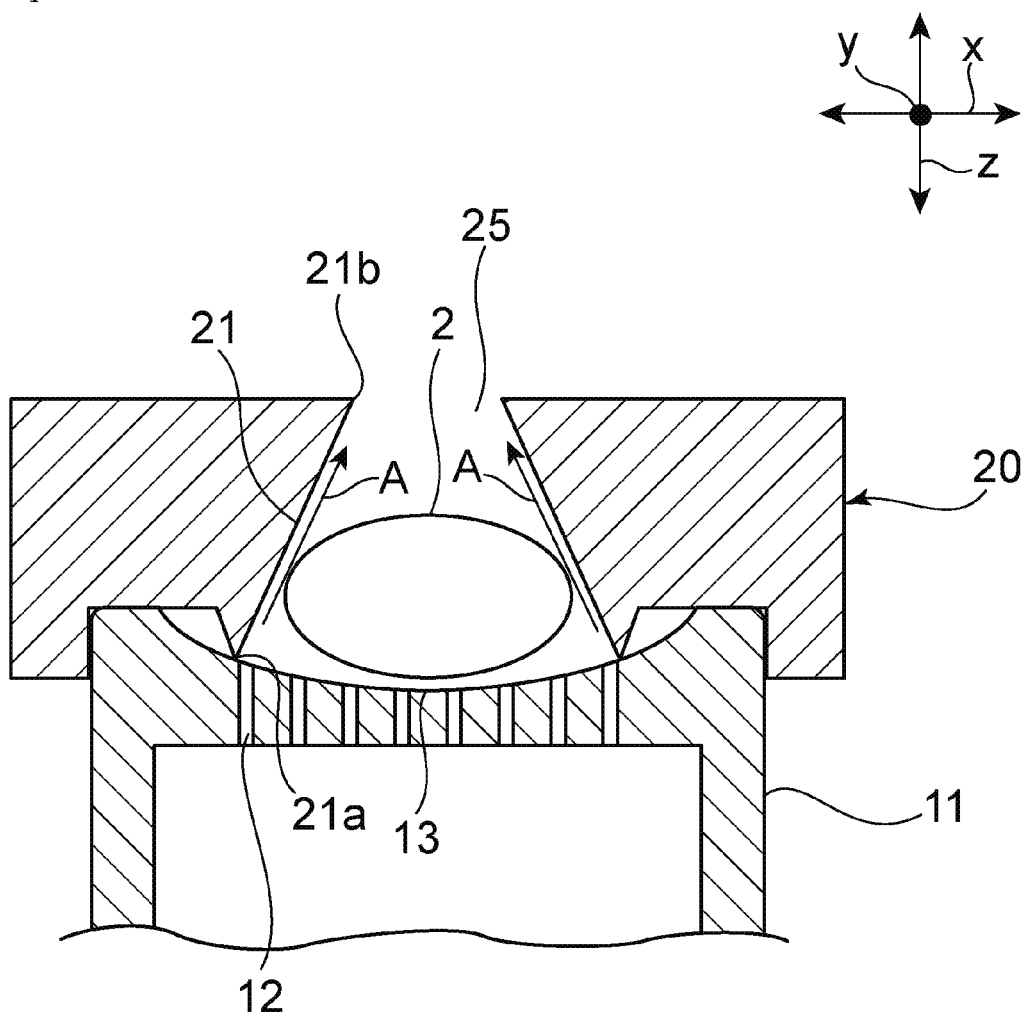

[FIG. 7]
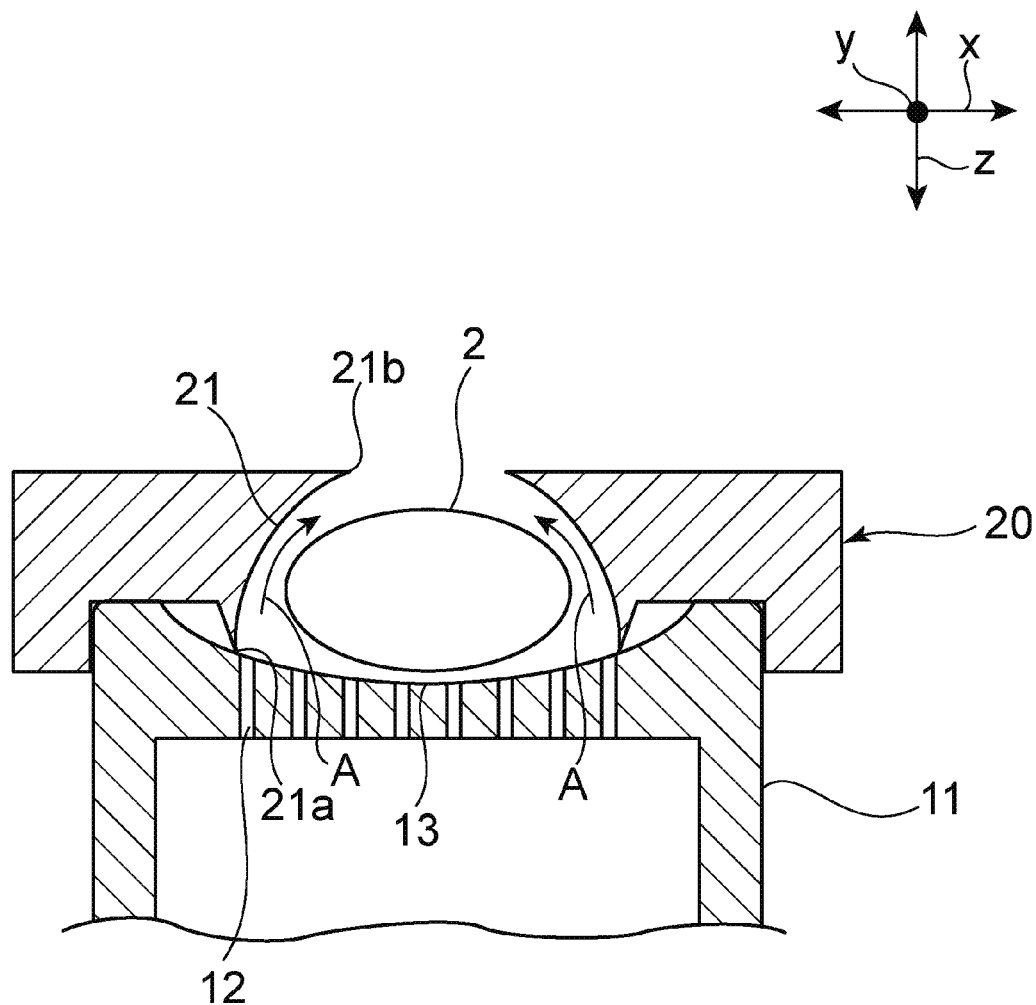

[FIG. 8]
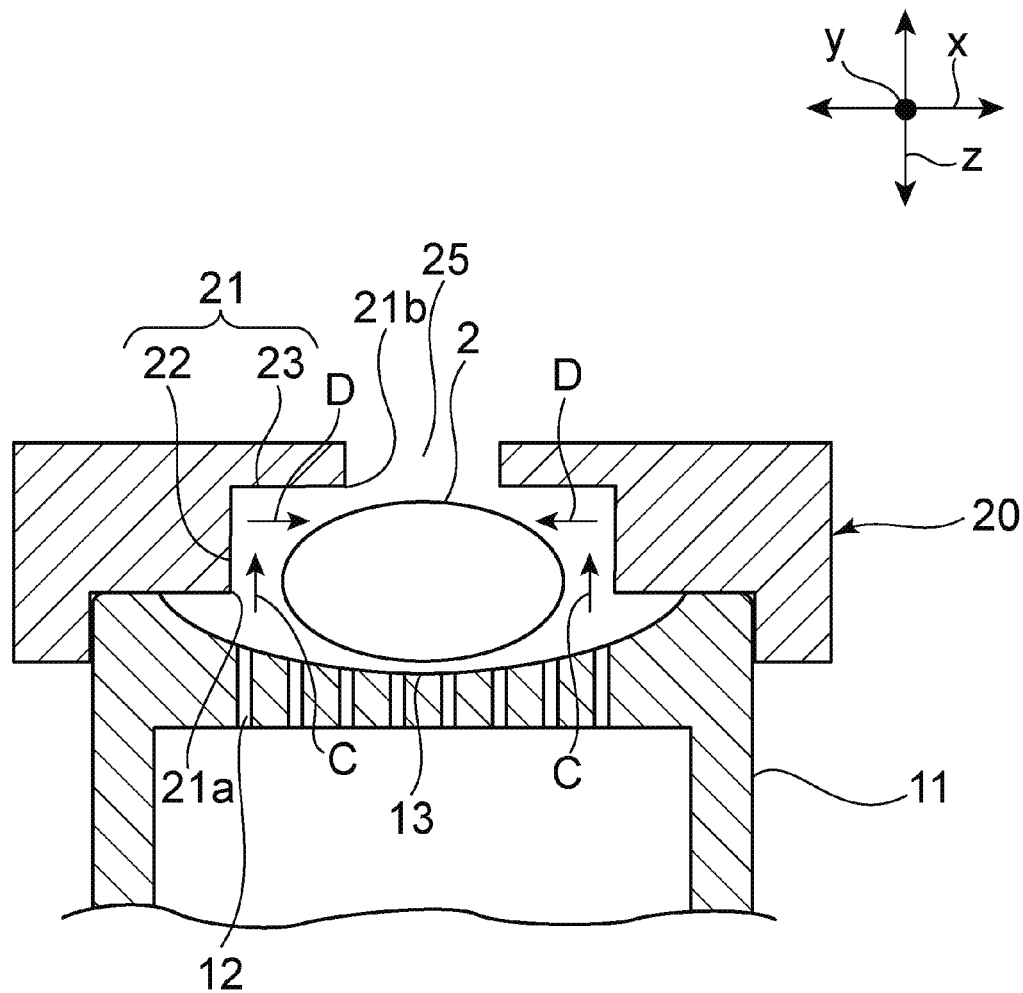

[FIG. 9]
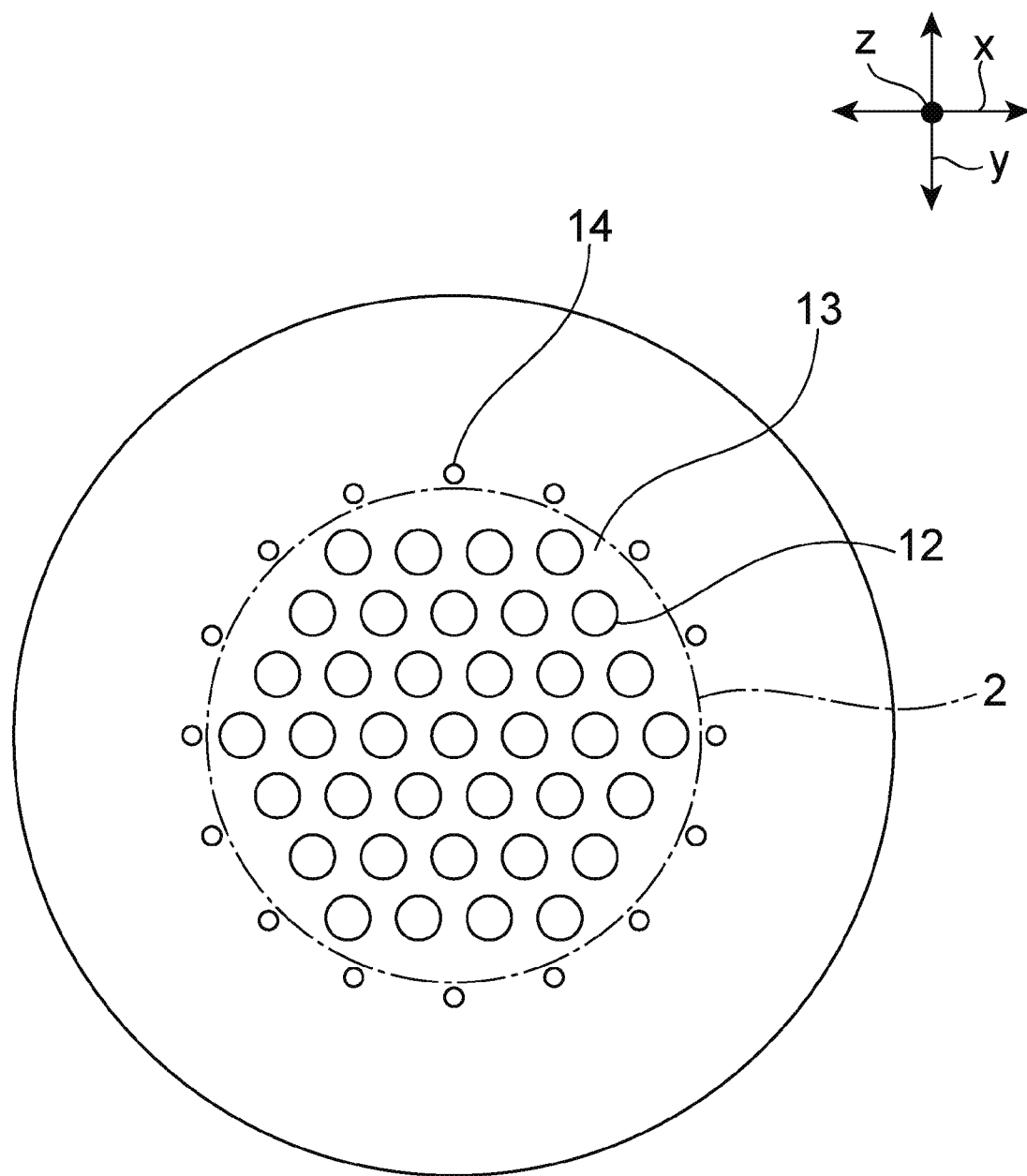

METHOD FOR PRODUCING GLASS MATERIAL AND APPARATUS FOR PRODUCING GLASS MATERIAL

TECHNICAL FIELD

The present invention relates to methods and apparatuses for producing glass materials by containerless levitation techniques.

BACKGROUND ART

In recent years, studies on containerless levitation techniques as methods for producing glass materials are being conducted. For example, Patent Literature 1 describes a method for vitrifying a barium-titanium-based ferroelectric sample by heating the barium-titanium-based ferroelectric sample levitated in an aerodynamic levitation furnace to melting by irradiation with a laser beam and then cooling it. The containerless levitation techniques can reduce the progress of crystallization of a material due to contact with the wall surface of a container in the above manner and, therefore, can vitrify even materials that could not be vitrified by conventional production methods using containers. Hence, the containerless levitation techniques are noteworthy as methods enabling the production of glass materials having novel compositions.

In Patent Literature 2, a larger glass material is obtained using a containerless levitation technique in which a forming surface having a plurality of gas jet holes is used. Provision of a large-sized glass material is preferred because it increases the variety of application possibilities.

CITATION LIST

Patent Literature

[PTL 1]
JP-A-2006-248801
[PTL 2]
JP-A-2014-141389

SUMMARY OF INVENTION

Technical Problem

However, there is demand for a method that can produce an even larger glass material than in the method described in Patent Literature 2.

An object of the present invention is to provide a method and an apparatus for producing a glass material by a containerless levitation technique, which enable production of a large-sized glass material.

Solution to Problem

A production method according to the present invention is a method for producing a glass material by heating a block of glass raw material to melting while holding the block of glass raw material levitated in substantially a vertical direction and then cooling the melted block of glass raw material and includes the steps of: preparing a forming member and a cover member, the forming member including a gas jetting portion in which a plurality of gas jet holes for use in levitating the block of glass raw material are formed, the cover member which is capable of covering a peripheral portion of a gas jetting surface of the gas jetting portion and in which a controlling surface controlling, near the peripheral portion of the gas jetting surface, a flow of gas jetted through the gas jet holes is formed and an opening capable of releasing the gas to outside is formed; placing the block of glass raw material on top of the gas jetting surface and covering the peripheral portion of the gas jetting surface with the cover member; and heating the block of glass raw material to melting while holding the block of glass raw material levitated by jetting the gas through the gas jet holes and then cooling the melted block of glass raw material.

A lower end of the controlling surface is preferably located outwardly of an outer edge of a melt of the block of glass raw material in substantially a horizontal direction.

An upper end of the controlling surface is preferably located inwardly of an outer edge of a melt of the block of glass raw material in substantially a horizontal direction.

An inclination connecting a lower end and an upper end of the controlling surface is preferably an inward inclination from the lower end toward the upper end. In this case, an angle of the inclination is preferably 5° to 45°.

An upper end of the controlling surface may be located at the same height as or above a center of a melt of the block of glass raw material in substantially the vertical direction.

A production apparatus according to the present invention is an apparatus for producing a glass material by heating a block of glass raw material to melting while holding the block of glass raw material levitated in substantially a vertical direction by gas and then cooling the melted block of glass raw material and includes: a forming member including a gas jetting portion in which a plurality of gas jet holes for use in levitating the block of glass raw material are formed; a cover member which is capable of covering a peripheral portion of a gas jetting surface of the gas jetting portion and in which a controlling surface controlling, near the peripheral portion of the gas jetting surface, a flow of gas jetted through the gas jet holes is formed and an opening capable of releasing the gas to outside is formed; a gas supplying device capable of supplying the gas into the gas jet holes; and a heating device capable of heating the block of glass raw material.

Advantageous Effects of Invention

The present invention enables production of a large-sized glass material by containerless levitation.

BRIEF DESCRIPTION OF DRAWINGS

FIG. 1 is a schematic cross-sectional view for illustrating a production method (production apparatus) according to a first embodiment of the present invention.

FIG. 2 is a schematic cross-sectional view showing a gas jetting portion of a forming member and a cover member in the first embodiment of the present invention.

FIG. 3 is a schematic plan view showing the gas jetting portion of the forming member and the cover member in the first embodiment of the present invention.

FIG. 4 is a schematic cross-sectional view showing a method for producing a glass material in the first embodiment of the present invention.

FIG. 5 is a schematic cross-sectional view showing a method for producing a glass material in a second embodiment of the present invention.

FIG. 6 is a schematic cross-sectional view showing a method for producing a glass material in a third embodiment of the present invention.

FIG. 7 is a schematic cross-sectional view showing a method for producing a glass material in a fourth embodiment of the present invention.

FIG. 8 is a schematic cross-sectional view showing a method for producing a glass material in a fifth embodiment of the present invention.

FIG. 9 is a schematic plan view showing a gas jetting portion of a forming member in a sixth embodiment of the present invention.

DESCRIPTION OF EMBODIMENTS

Hereinafter, a description will be given of preferred embodiments. However, the following embodiments are merely illustrative and the present invention is not limited to the following embodiments. Throughout the drawings, elements having substantially the same functions may be referred to by the same reference signs.

First Embodiment

FIG. 1 is a schematic cross-sectional view for illustrating a production method (production apparatus) according to a first embodiment of the present invention. As shown in FIG. 1, a block 1 of glass raw material is placed while held levitated above a gas jetting surface 13 of a gas jetting portion 11 of a forming member 10. In the gas jetting portion 11, a plurality of gas jet holes 12 are formed through which gas 32 can be jetted from the gas jetting surface 13. The jetting of the gas 32 through the gas jet holes 12 causes the block 1 of glass raw material to be levitated in substantially a vertical direction (the z direction). When the gas 32 is supplied into the gas jet holes 12 from a gas supplying device 31, such as a gas cylinder, the gas 32 is jetted through the gas jet holes 12. The gas jetting surface 13 is formed in the shape of a concave sphere. A cover member 20 capable of covering a peripheral portion of the gas jetting surface 13 is set up on the top of the gas jetting portion 11.

No particular limitation is placed on the type of the gas 32 and the gas 32 may be, for example, air; oxygen; an inert gas, such as nitrogen gas, argon gas or helium gas; carbon monoxide gas; carbon dioxide gas; or a reducing gas containing hydrogen.

The forming member 10 can be made of, for example, silicon carbide, super steel, stainless steel, duralumin, carbon or so on. Note that the gas jetting portion 11 may be made of any of the above materials and the portions other than the gas jetting portion 11 may be made of other materials.

While held levitated in the above manner, the block 1 of glass raw material is heated to melting and vitrified by irradiation with laser light from a laser applicator 30 as a heating device and then cooled, thus obtaining a glass material. At least during the process of heating the block 1 of glass raw material to melting and the process of cooling the glass material at least to below the softening point, the jetting of gas 32 is preferably continued to avoid the contact of the block 1 of glass raw material or the glass material with the gas jetting surface 13. The method for heating the block 1 of glass raw material is not particularly limited to the method of irradiating it with laser light. For example, the block 1 of glass raw material may be heated by radiant heat.

FIG. 2 is a schematic cross-sectional view showing the gas jetting portion of the forming member and the cover member in the first embodiment of the present invention and FIG. 3 is a schematic plan view showing them. As shown in FIG. 2, the cover member 20 capable of covering the peripheral portion of the gas jetting surface 13 is set up on the top of the gas jetting portion 11. The cover member 20 has a controlling surface 21 formed to control, near the peripheral portion of the gas jetting surface 13, the flow of gas jetted through the gas jet holes 12. In this embodiment, the lower end 21a of the controlling surface 21 is provided in contact with the gas jetting surface 13. Furthermore, in this embodiment, the lower end 21a of the controlling surface 21 is provided outwardly of the gas jet holes 12 arranged outermost in substantially a horizontal direction (i.e., the x and y directions). The cover member 20 has an opening 25 formed at the top thereof for the purpose of releasing the gas jetted through the gas jet holes 12 to the outside. The opening 25 is formed along the upper end 21b of the controlling surface 21.

In this embodiment, the controlling surface 21 is formed to incline inwardly from the lower end 21a toward the upper end 21b. The controlling surface 21 is preferably formed so that the angle θ of inclination connecting the lower end 21a and the upper end 21b is 5° to 45°. The angle θ of inclination is more preferably 7° to 40° and particularly preferably 10° to 35°. The angle θ of inclination is the angle to substantially the vertical direction (the z direction).

As shown in FIG. 3, when viewed from substantially the vertical direction (the z direction), the gas jetting portion 11, the cover member 20, and the opening 25 in this embodiment have circular shapes. In this embodiment, the gas jet holes 12 are arranged radially from the center toward the outside and at equal intervals in substantially the horizontal direction (the x and y directions).

The diameter of the gas jet holes 12 is preferably not more than 3 mm, more preferably not more than 2 mm, still more preferably not more than 1 mm, particularly preferably not more than 0.8 mm, and most preferably not more than 0.5 mm. However, if the diameter of the gas jet holes 12 is too small, gas may become difficult to jet through the gas jet holes 12. Therefore, the diameter of the gas jet holes 12 is preferably not less than 0.01 mm and more preferably not less than 0.05 mm. The center distance between the gas jet holes 12 adjacent to each other is preferably 0.02 mm to 4 mm, more preferably 0.1 mm to 2 mm, still more preferably 0.2 mm to 1.6 mm, and particularly preferably 0.2 mm to 0.8 mm.

In this embodiment, as shown in FIG. 2, the provision of the controlling surface 21 near the peripheral portion of the gas jetting surface 13 enables the control of the flow of gas jetted through the gas jet holes 12. Specifically, the gas near the peripheral portion can be controlled to flow in directions A along the controlling surface 21.

FIG. 4 is a schematic cross-sectional view showing a method for producing a glass material in the first embodiment of the present invention. The block 1 of glass raw material is placed on top of the gas jetting surface 13 of the gas jetting portion 11 and the peripheral portion of the gas jetting surface 13 of the gas jetting portion 11 is covered by the cover member 20. Next, while being held levitated by jetting gas through the gas jet holes 12, the block 1 of glass raw material is heated to melting. When heated to melting, the block 1 of glass raw material is formed into a glass melt 2. FIG. 4 shows a state of the glass melt 2 levitated above the gas jetting surface 13.

After the block 1 of glass raw material is heated to melting and vitrified into a glass melt 2, the glass melt 2 is cooled, so that a glass material can be obtained.

As described previously, in this embodiment, the provision of the controlling surface 21 near the peripheral portion of the gas jetting surface 13 enables gas jetted through the gas jet holes 12 to be controlled to flow in the directions A along the controlling surface 21. Thus, the flow of gas near the peripheral portion can be directed inwardly. In addition, the flow rate of gas near the peripheral portion can be made faster than the flow rate of gas in the center. Therefore, the flow of gas near the peripheral portion can be directed inwardly and increased in flow rate. Hence, a wall of the gas can be formed near the periphery of the glass melt 2. The formation of such a wall enables the glass melt 2 to be held within the gas wall to prevent the glass melt 2 in a levitated state from being displaced into contact with the gas jetting surface 13 of the forming member 10 or others.

When the glass melt 2 is increased in size for the purpose of producing a large-sized glass material, the glass melt 2 becomes likely to be displaced into contact with the forming member 10 or others. Therefore, conventional containerless levitation techniques have the problem that they cannot produce large-sized glass materials. According to the present invention, even when the glass melt 2 is increased in size, the glass melt 2 can be held within the gas wall to prevent its displacement, which enables the production of a large-sized glass material.

As shown in FIG. 4, the lower end 21a of the controlling surface 21 is preferably located outwardly of the outer edge of the glass melt 2 in substantially the horizontal direction. This enables the control of the flow of gas outside the outer edge of the glass melt 2. The location of the lower end 21a of the controlling surface 21 is preferably on the circumference of a concentric circle having a diameter 1.05 times to 1.6 times as large as the diameter of the glass melt 2 in substantially the horizontal direction. The diameter of the concentric circle is more preferably 1.06 times to 1.55 times and still more preferably 1.08 times to 1.5 times as large as that of the glass melt 2. Within the above ranges, the flow of gas near the outer edge of the glass melt 2 can be controlled.

Furthermore, the upper end 21b of the controlling surface 21 is preferably located inwardly of the outer edge of the glass melt 2 in substantially the horizontal direction. Thus, the flow of gas near the outer edge of the glass melt 2 can be directed inwardly. The location of the upper end 21b of the controlling surface 21 is preferably on the circumference of a concentric circle having a diameter 0.4 times to 1.6 times (exclusive of 1.6 times) as large as the diameter of the glass melt 2 in substantially the horizontal direction. The diameter of the concentric circle is more preferably 0.45 times to 1.55 times and still more preferably 0.5 times to 1.5 times as large as that of the glass melt 2. Within the above ranges, the flow of gas near the outer edge of the glass melt 2 can be controlled.

In this embodiment, the angle of inclination of the controlling surface 21 is $\theta > 0°$ and the controlling surface 21 is formed to incline inwardly from the lower end 21a toward the upper end 21b. Thus, the flow of gas near the peripheral portion can be directed inwardly, so that the displacement of the glass melt 2 can be more effectively prevented. However, the present invention is not limited to this and, even when the controlling surface 21 is formed in substantially the vertical direction, the flow rate of gas near the peripheral portion can be made faster than the flow rate of gas in the center. Therefore, a gas wall can be formed near the peripheral portion, so that the displacement of the glass melt 2 can be prevented.

The location of the upper end 21b of the controlling surface 21 is preferably at the same height as or above the center of the levitated glass melt 2 in substantially the vertical direction. Thus, the displacement of the glass melt 2 can be effectively prevented by the flow of gas jetted through the gas jet holes 12. Furthermore, the location of the upper end 21b of the controlling surface 21 is appropriately selected in consideration of the angle $\theta$ of inclination of the controlling surface 21, the required size of the opening 25, and so on.

In this embodiment, the cover member 20 is a member separate from the forming member 10 and the cover member 20 is usually set up to cover the peripheral portion of the gas jetting surface 13 after the block 1 of glass raw material is placed on top of the gas jetting surface 13. By doing so, particularly when the block 1 of glass raw material is large, more specifically, even when the block 1 of glass raw material is larger than the opening 25 of the cover member 20, the block 1 of glass raw material can be easily placed within a space surrounded by the gas jetting surface 13 and the controlling surface 21. However, the present invention is not limited to this manner and the block 1 of glass raw material may be placed on top of the gas jetting surface 13 after the cover member 20 is set up to cover the peripheral portion of the gas jetting surface 13. In this case, the cover member 20 and the forming member 10 may be integrally formed.

Second Embodiment

FIG. 5 is a schematic cross-sectional view showing a method for producing a glass material in a second embodiment of the present invention. In this embodiment, the lower end 21a of the controlling surface 21 is provided to avoid contact with the gas jetting surface 13. Thus, a clearance is formed between the lower end 21a of the controlling surface 21 and the gas jetting surface 13. Therefore, gas jetted through the gas jet holes 12 formed outwardly of the lower end 21a of the controlling surface 21 can be guided inwardly through the clearance. Hence, inward gas flows along directions B shown in FIG. 5 can be formed below the glass melt 2, so that the displacement of the glass melt 2 can be more effectively prevented. In addition, a larger number of gas jet holes 12 can be formed in the gas jetting surface 13, so that a larger amount of gas can be used.

Also in this embodiment, since the displacement of the glass melt 2 can be prevented, a large-sized glass material can be produced.

Third Embodiment

FIG. 6 is a schematic cross-sectional view showing a method for producing a glass material in a third embodiment of the present invention. In this embodiment, the opening 25 of the cover member 20 is located above the glass melt 2. Therefore, in this embodiment, the upper end 21b of the controlling surface 21 is located above the glass melt 2. Thus, the controlling surface 21 can be formed long in substantially the vertical direction, so that the flow of gas jetted through the gas jet holes 12 can be more effectively controlled. In this embodiment, specifically, the flow of gas near the peripheral portion can be directed more inwardly.

Also in this embodiment, since the displacement of the glass melt 2 can be prevented, a large-sized glass material can be produced.

Fourth Embodiment

FIG. 7 is a schematic cross-sectional view showing a method for producing a glass material in a fourth embodiment of the present invention. In this embodiment, the controlling surface 21 is formed in the shape of a concave sphere. The formation of the controlling surface 21 into the shape of a concave sphere enables the flow of gas to be controlled to proceed along the surface of the glass melt 2. Therefore, the flow of gas jetted through the gas jet holes 12 can be more effectively controlled, so that the displacement of the glass melt 2 can be more effectively prevented. In addition, since the controlling surface 21 is formed in the shape of a concave sphere, the glass melt 2, even if displaced, can be made less likely to be in contact with the controlling surface 21.

Also in this embodiment, since the displacement of the glass melt 2 can be prevented, a large-sized glass material can be produced.

Fifth Embodiment

FIG. 8 is a schematic cross-sectional view showing a method for producing a glass material in a fifth embodiment of the present invention. In this embodiment, the controlling surface 21 consists of a vertical surface 22 extending in substantially the vertical direction and a horizontal surface 23 connected to the vertical surface 22 and extending in substantially the horizontal direction. Therefore, the controlling surface 21 consists of a plurality of surfaces. Gas jetted through the gas jet holes 12 located near the peripheral portion of the gas jetting surface 13 is controlled to flow in the direction C by the vertical surface 22, then controlled to flow in directions D by the horizontal surface 23, and then released through the opening 25. Also in this embodiment, the lower end 21a of the controlling surface 21 is located outwardly the outer edge of the glass melt 2 in substantially the horizontal direction and the upper end 21b of the controlling surface 21 is located inwardly of the outer edge of the glass melt 2 in substantially the horizontal direction. With this structure, the flow of gas near the peripheral portion of the gas jetting surface 13 can be directed inwardly and the flow rate of gas near the peripheral portion of the gas jetting surface 13 can be made faster than the flow rate of gas in the center. Therefore, the displacement of the glass melt 2 can be effectively prevented.

Also in this embodiment, since the displacement of the glass melt 2 can be prevented, a large-sized glass material can be produced.

Sixth Embodiment

FIG. 9 is a schematic plan view showing a gas jetting surface of a forming member in a sixth embodiment of the present invention. As shown in FIG. 9, in this embodiment, the diameter of gas jet holes 14 formed near the peripheral portion of the gas jetting surface 13, more specifically, near the outer edge of the glass melt 2 in substantially the horizontal direction, is smaller than the diameter of the gas jet holes 12 formed inwardly of the outer edge of the glass melt 2. Thus, the flow rate of gas jetted through the gas jet holes 14 can be made faster than the flow rate of gas jetted through the gas jet holes 12. Therefore, according to this embodiment, the flow rate of gas near the peripheral portion of the gas jetting surface 13 can be made even faster than the flow rate of gas in the center. Hence, according to this embodiment, the displacement of the glass melt 2 can be more effectively prevented.

As shown in FIG. 9, the gas jet holes 12 in this embodiment are arranged so that their centers are located at each vertex of an equilateral triangle grid. The center distance between the gas jet holes 12 adjacent to each other is preferably 0.02 mm to 2 mm, more preferably 0.1 mm to 1 mm, and still more preferably 0.2 mm to 0.8 mm. Furthermore, as shown in FIG. 9, the gas jet holes 14 are arranged circumferentially along the outer edge of the glass melt 2. The center distance between the gas jet holes 14 adjacent to each other is preferably 0.02 mm to 15 mm, more preferably 0.1 mm to 7 mm, still more preferably 0.2 mm to 5 mm, particularly preferably 0.3 mm to 3 mm, and most preferably 0.5 mm to 1.5 mm. The gas jet holes 14 may be arranged, near the peripheral portion of the gas jetting surface 13, in a plurality of circumferential rows forming concentric circles having different diameters from each other.

The circumferences formed by the arrangement of the gas jet holes 14 have diameters in substantially the horizontal direction preferably 0.8 times to 1.5 times, more preferably 0.9 times to 1.4 times, and still more preferably 1.0 times to 1.35 times as large as the diameter of the glass melt 2 in substantially the horizontal direction. Within the above ranges, the displacement of the glass melt 2 can be more effectively prevented.

The diameter of the gas jet holes 14 is preferably within a range of 0.05 times to 0.95 times, more preferably within a range of 0.1 times to 0.8 times, and particularly preferably within a range of 0.2 times to 0.7 times as large as the diameter of the gas jet holes 12. Within the above ranges, the displacement of the glass melt 2 can be more effectively prevented.

The arrangement of the gas jet holes 12 the centers of which are located at each vertex of an equilateral triangle grid in this embodiment may be applied to the arrangements of the gas jet holes 12 in the first to fifth embodiments.

The present invention enables production of a large-sized glass material by containerless levitation. Therefore, a large-sized glass material can be formed from a glass having a composition that could not be vitrified by melting methods using a container, such as a network forming oxide-free glass. Examples of such a glass that can be cited include terbium-boric acid composite oxide-based glass materials, barium titanate-based glass materials, lanthanum-niobium composite oxide-based glass materials, lanthanum-niobium-aluminum composite oxide-based glass materials, lanthanum-niobium-tantalum composite oxide-based glass materials, lanthanum-tungsten composite oxide-based glass materials, lanthanum-titanium composite oxide glass materials, and lanthanum-titanium-zirconia composite oxide glass materials.

The present invention will be described below in further detail with reference to specific examples, but the present invention is not at all limited by the following examples, and modifications and variations may be appropriately made therein without changing the gist of the invention.

Example 1

First, raw material powders were weighed and mixed and the powder mixture was calcined at a temperature around 1000° C. and thus sintered. An amount of piece having a desired volume was cut out of the sintered body to prepare a block 1 of glass raw material.

Next, using an apparatus for producing a glass material based on FIG. 1, the block 1 of glass raw material was heated to melting under the following conditions to produce a glass material. Specific procedures are shown below.

First, the block 1 of glass raw material was placed on top of the gas jetting surface 13 of the forming member 10 and the cover member 20 was set up on the top of the gas jetting portion 11. Next, while gas was supplied from the gas supplying device 31 into the gas jet holes 12 to hold the block 1 of glass raw material levitated above the gas jetting surface 13, the block 1 of glass raw material was heated to melting by irradiation with carbon dioxide laser at an output power of 100 W. Note that the gas jet holes 12 in the forming member 10 were arranged so that their centers were located at each vertex of an equilateral triangle grid. Thereafter, the laser irradiation was stopped to cool the block of raw glass material, thus obtaining a glass material. The cover member 20 was removed and the glass material was picked up. The diameter of the glass material was 8.48 mm.

The glass composition (molar ratio): $0.6Tb_2O_3$-$0.3B_2O_3$-$0.1SiO_2$

The location of the lower end 21a of the controlling surface 21: 9.34 mm (1.1 times as large as the diameter of the glass melt 2)

The angle θ of inclination of the controlling surface 21: 10°

The diameter of the gas jet holes 12: 0.3 mm
The number of gas jet holes 12: 350
The heating temperature: 1850° C.
The gas used: nitrogen gas Example 2

The same production process as in Example 1 was performed except for the following conditions. As a result, a glass material with a diameter of 8.62 mm was obtained.

The glass composition (molar ratio): $0.6Tb_2O_3$-$0.3B_2O_3$-$0.1SiO_2$

The location of the lower end 21a of the controlling surface 21: 10.35 mm (1.2 times as large as the diameter of the glass melt 2)

The angle θ of inclination of the controlling surface 21: 20°

The diameter of the gas jet holes 12: 0.3 mm
The number of gas jet holes 12: 350
The heating temperature: 1850° C.
The gas used: nitrogen gas Example 3

The same production process as in Example 1 was performed except for the following conditions. As a result, a glass material with a diameter of 8.80 mm was obtained.

The glass composition (molar ratio): $0.6Tb_2O_3$-$0.3B_2O_3$-$0.1SiO_2$

The location of the lower end 21a of the controlling surface 21: 13.20 mm (1.5 times as large as the diameter of the glass melt 2)

The angle θ of inclination of the controlling surface 21: 30°

The diameter of the gas jet holes 12: 0.3 mm
The number of gas jet holes 12: 350
The heating temperature: 1850° C.
The gas used: nitrogen gas Comparative Example The same production process as in Example 1 was performed without covering the peripheral portion of the gas jetting surface 13 of the forming member 10 with the cover member 20. As a result, glass materials with diameters of up to 5.25 mm could be produced, but any glass material with a diameter of 6 mm or more could not be produced.

REFERENCE SIGNS LIST

1 . . . block of glass raw material
2 . . . glass melt
10 . . . forming member
11 . . . gas jetting portion
12 . . . gas jet hole
13 . . . gas jetting surface
14 . . . gas jet hole
20 . . . cover member
21 . . . controlling surface
21a . . . lower end
21b . . . upper end
22 . . . vertical surface
23 . . . horizontal surface
25 . . . opening
30 . . . laser applicator
31 . . . gas supplying device
32 . . . gas

The invention claimed is:

1. A method for producing a glass material by heating a block of glass raw material to melting while holding the block of glass raw material levitated in substantially a vertical direction and then cooling the melted block of glass raw material, the method comprising the steps of:
    preparing a forming member and a cover member, the forming member including a gas jetting portion in which a plurality of gas jet holes for use in levitating the block of glass raw material are formed, the cover member which is capable of covering a peripheral portion of a gas jetting surface of the gas jetting portion and in which a controlling surface controlling, near the peripheral portion of the gas jetting surface, a flow of gas jetted through the plurality of gas jet holes is formed and an opening capable of releasing the gas to outside is formed;
    placing the block of glass raw material on top of the gas jetting surface and covering the peripheral portion of the gas jetting surface with the cover member; and
    heating the block of glass raw material to melting while holding the block of glass raw material levitated by jetting the gas through the plurality of gas jet holes and then cooling the melted block of glass raw material; wherein
    an inclination connecting a lower end and an upper end of the controlling surface is an inward inclination from the lower end toward the upper end.

2. The method for producing a glass material according to claim 1, wherein the lower end of the controlling surface is located outwardly of an outer edge of a melt of the block of glass raw material in substantially a horizontal direction.

3. The method for producing a glass material according to claim 1, wherein the upper end of the controlling surface is located inwardly of an outer edge of a melt of the block of glass raw material in substantially a horizontal direction.

4. The method for producing a glass material according to claim 1, wherein an angle of the inclination is 5° to 45°.

5. The method for producing a glass material according to claim 1, wherein the upper end of the controlling surface is located at the same height as or above a center of a melt of the block of glass raw material in substantially the vertical direction.

6. An apparatus for producing a glass material by heating a block of glass raw material to melting while holding the block of glass raw material levitated in substantially a vertical direction by gas and then cooling the melted block of glass raw material, the apparatus comprising:
    a forming member including a gas jetting portion in which a plurality of gas jet holes for use in levitating the block of glass raw material are formed;

a cover member which is capable of covering a peripheral portion of a gas jetting surface of the gas jetting portion and in which a controlling surface controlling, near the peripheral portion of the gas jetting surface, a flow of gas jetted through the plurality of gas jet holes is formed and an opening capable of releasing the gas to outside is formed;

a gas supplying device capable of supplying the gas into the plurality of gas jet holes; and a heating device capable of heating the block of glass raw material; wherein an inclination connecting a lower end and an upper end of the controlling surface is an inward inclination from the lower end toward the upper end.

\* \* \* \* \*